No. 617,546. Patented Jan. 10, 1899.
E. THOMSON.
CONTROLLING ELECTRIC MOTORS AND TRAINS.
(Application filed Feb. 28, 1898.)
(No Model.) 3 Sheets—Sheet 2.
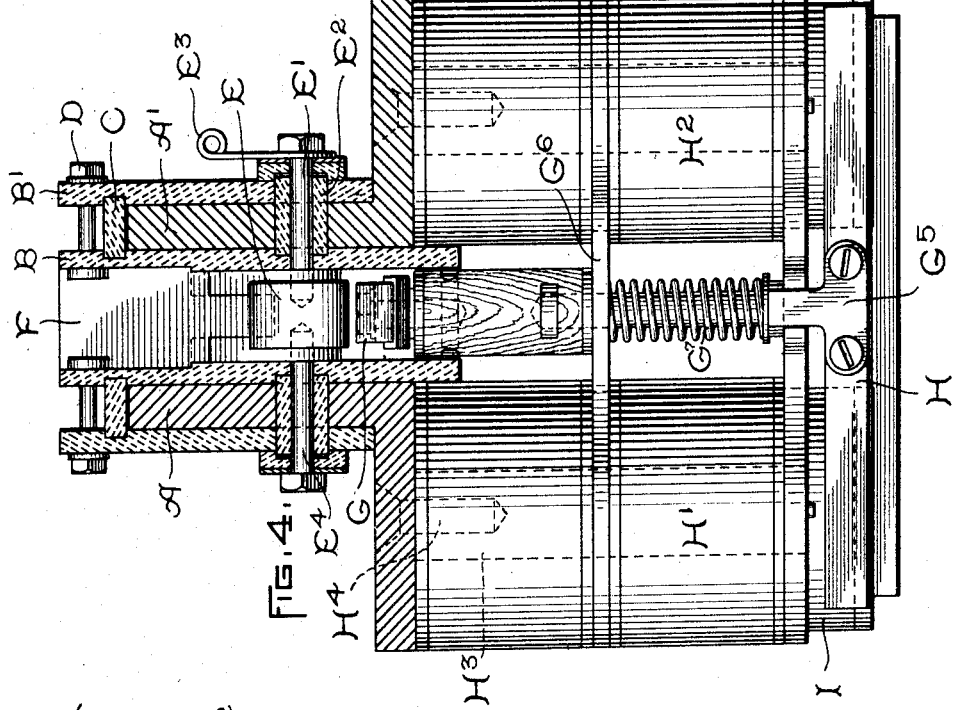
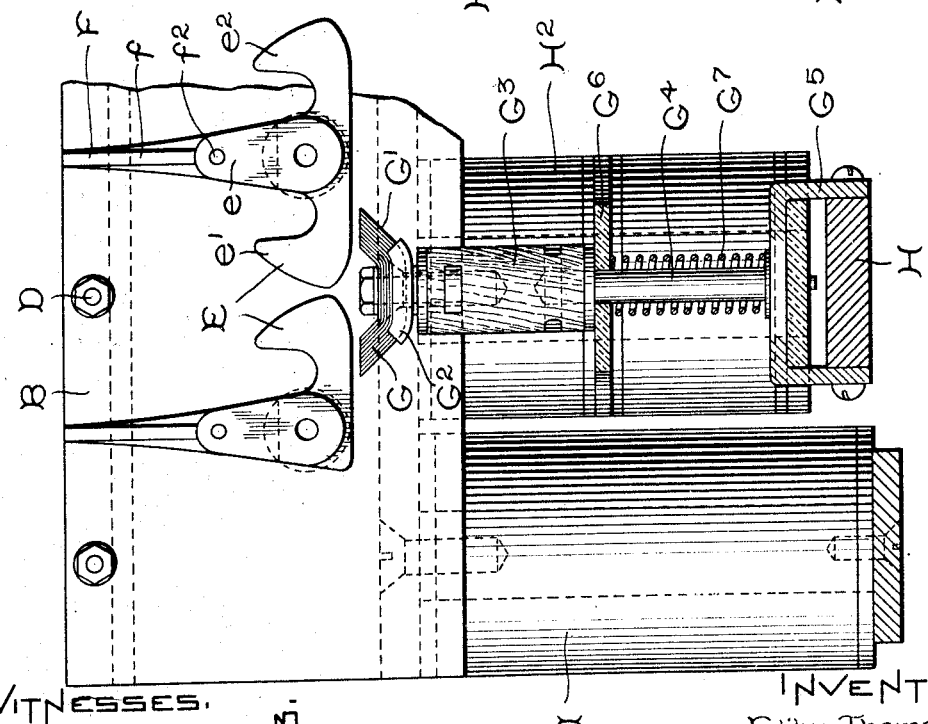
WITNESSES.
A. H. Abell.
A. F. Macdonald.
INVENTOR.
Elihu Thomson.
by Albert G. Davis.
Atty.

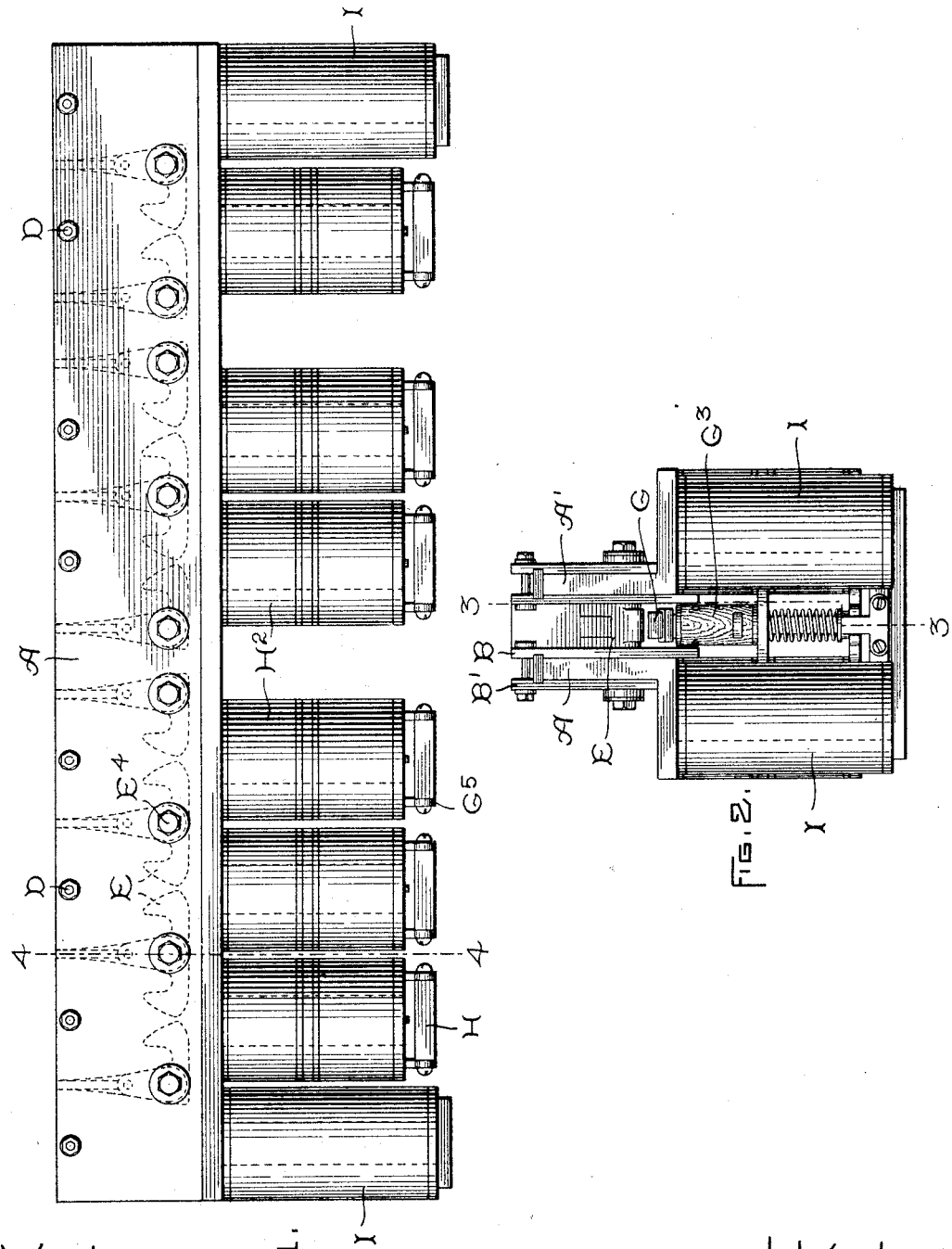

No. 617,546. Patented Jan. 10, 1899.
E. THOMSON.
CONTROLLING ELECTRIC MOTORS AND TRAINS.
(Application filed Feb. 28, 1898.)
(No Model.) 3 Sheets—Sheet 3.
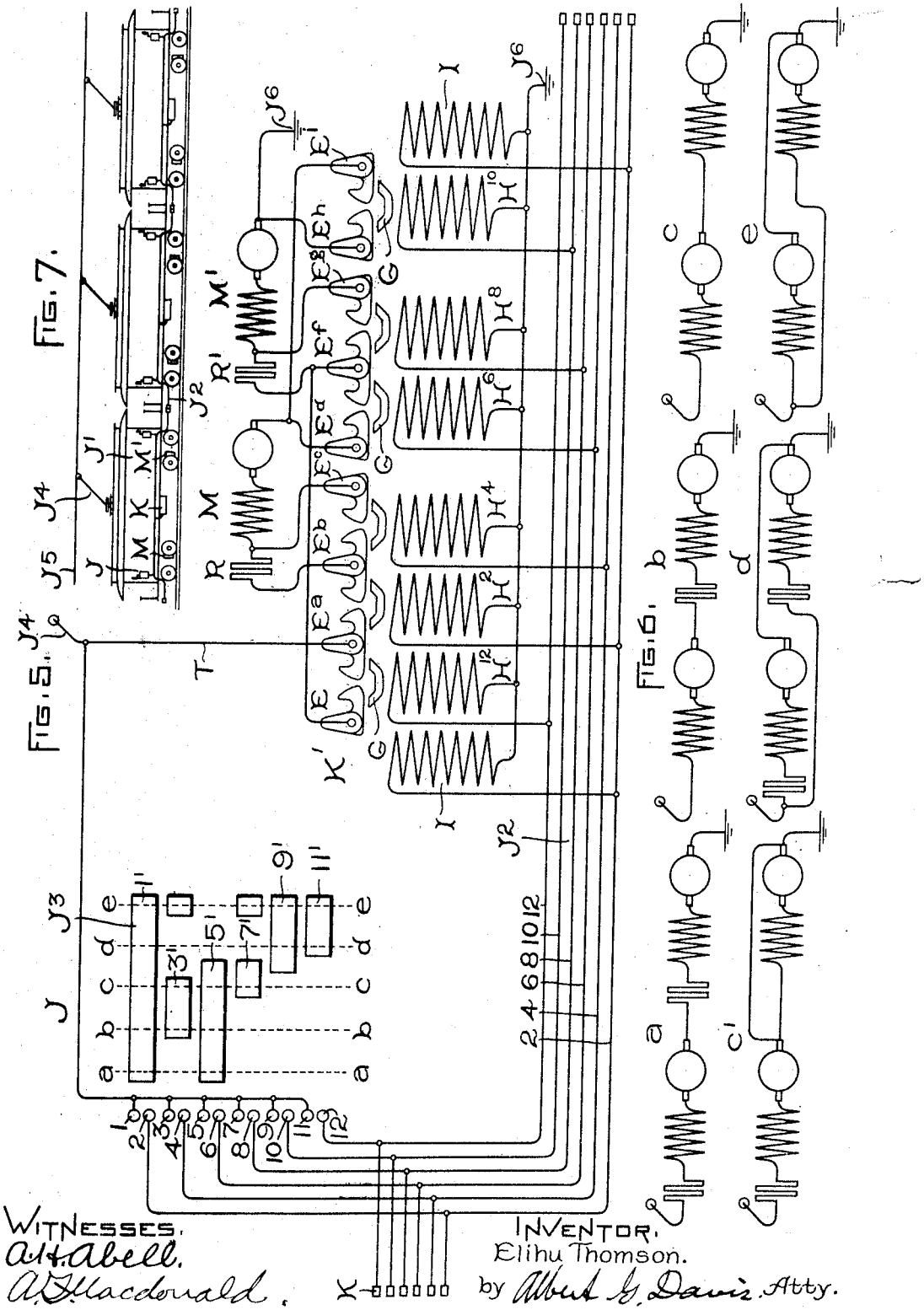
WITNESSES.
A. H. Abell.
A. F. Macdonald.
INVENTOR.
Elihu Thomson.
by Albert G. Davis, Atty.

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

CONTROLLING ELECTRIC MOTORS AND TRAINS.

SPECIFICATION forming part of Letters Patent No. 617,546, dated January 10, 1899.

Application filed February 28, 1898. Serial No. 671,993. (No model.)

*To all whom it may concern:*

Be it known that I, ELIHU THOMSON, a citizen of the United States, residing at Swampscott, in the county of Essex, State of Massachusetts, have invented certain new and useful Improvements in Controlling Electric Motors and Trains, (Case No. 724,) of which the following is a specification.

In the practical operation of electric motors it is usual to provide for each motor or set of motors a controller for regulating the speed and torque. For example, it is usual in traction-work to provide a car with one or more motors located under the car and with a controller on each platform, each controller consisting of one or more manually-rotatable barrel switches or cylinders bearing upon brushes connected to the source of current and the motors. Such an arrangement may be satisfactory where the motors are located in close proximity to the points of contact and when the currents to be controlled are not too heavy; but I find it preferable for many reasons to locate a controller directly at each set of motors—for example, in the special case of an electric street-car under the car—and to operate it or to control its operation from one or more selected points.

It is the object of my invention to provide a method and apparatus whereby this result may be accomplished in a simple and reliable manner and whereby the point or points of contact may be moved to any desired distance from the motor or motors, and also to simplify and improve motor-controllers of the series-parallel and other types.

In order to obtain the greatest tractive and accelerating effort of a train for a given motive force, it is necessary to divide that force into a number of units and distribute them through the train, thereby utilizing the tractive effort of the various cars. This arrangement also has the additional advantage of economical operation, for by changing the number of units the motive power of the train can be so proportioned to the load that it will work more nearly at its full-load capacity, and consequently at higher efficiency than would be the case if a single unit were employed, which was large enough to take care of the traffic at all times, and consequently when the load was light was obliged to work at a reduced efficiency.

In electric-train systems it is often necessary to change the number of motor-cars on the train—for example, by adding one or more when the traffic is heavy, as at night and morning, or leaving off one or more motor-cars during the portions of the day when the traffic is light—and in order to operate a system of this kind successfully it is necessary to provide means whereby this change in the number of motor-cars on the train can be made without affecting the operation of the remainder of the system.

My invention has for its object to provide a system of train control in which the number of motor-cars can be varied at will to suit the different conditions of traffic and the motors of the train controlled from any one of a number of master-controllers, which are located at convenient points on the train.

It is one advantage of my invention that each car may be made to form an independent unit capable of being run separately, and also capable of being joined in a train with one or more other similar cars and of operating in such relation without change of its circuits or connections.

The particular arrangement of the motor-cars on the train is immaterial, and while I have shown each car provided with motors and controllers it is within my invention to place trail-cars between the motor-cars and connect the motor-cars by suitable cables running through the trail-cars or make any other desired connection.

In the accompanying drawings, which represent a particular embodiment of my invention, Figure 1 is a side elevation of my improved motor-controller. Fig. 2 is an end elevation. Fig. 3 is an enlarged sectional detail taken on line 3 3 of Fig. 2. Fig. 4 is an enlarged cross-section taken on the line 4 4 of Fig. 1. Fig. 5 is a diagram of connections. Fig. 6 is a diagram of the motor connections, and Fig. 7 shows a three-car train equipped with my invention.

The main body of the motor-controller consists of two angle-irons A A', situated side by side and constituting the pole-pieces of a blow-out magnet for disrupting any arc which may be formed between the contacts. Situated on each side of the vertically-extending portion of the angle-irons are fiber walls B B', which are secured together by bolts D and are so arranged that they insulate the moving and stationary contacts from the iron, at the same time protecting the iron from injury due to arcing. The upper ends of the fiber walls are grooved to receive fiber pieces C, Fig. 4, which protect the upper end of the angle-irons. Located between the fiber walls and the angle-irons are stationary contacts E, their relation being best shown in Figs. 1 and 3. The contacts are secured in place by bolts E' E⁴, which extend through the angle-irons from the outside. These bolts are insulated from the iron by bushings E², Fig. 4, but are in electrical connection with the stationary contacts. Electrical connection with each contact is established by means of one of the bolts and a terminal E³, each of which terminals is retained in place by the head of the corresponding bolt. Two kinds of contacts are provided—single and double. These are similar in construction, with the exception that each of the single contacts establishes connection with one moving contact and each of the double contacts with two. The double contacts comprise a central body $e$, Fig. 3, having horns $e'$ and $e^2$, which are curved backward, so that any arc formed between adjacent contacts will as it is blown upward by the magnetic field of the angle-irons be elongated until the potential is no longer able to maintain it. The central portion of each contact is cut away to receive insulating pieces or partitions F, which partitions, together with the side walls B, form arc-restraining chutes. The partitions F are slightly tapered toward their upper ends, so that the area of the chute slightly increases toward the upper end to allow for the expansion of the arc-vapor. The partitions are secured in place by ribs $f$, which enter grooves in the side walls, and pins $f^2$, which pass through the contacts.

In assembling the controller the insulating-walls B and B' are mounted in place on the angle-irons, the stationary contacts secured by bolts E' to one of the angle-irons, the partitions F mounted in place, and the opposite angle-iron secured in place by bolts E⁴.

Electrical connection between stationary contacts is established by a series of separate electromagnetically-operated contacts G. Each contact consists of a bundle of thin copper strips G', mounted in a suitable holder G², carried by an insulated support G³. To the lower end of each insulating-support is secured a rod G⁴, which is provided on its lower end with a fork G⁵. Mounted in the fork is an armature H, consisting of a rectangular piece of iron, and between the fork and the guide G⁶ is a spring G⁷, which returns the armature to the position shown and opens the circuit between stationary contacts E as soon as the magnets are deënergized. Each armature is acted upon by two shunt-magnets H' H². These magnets are provided with cores H³, which are secured to the angle-irons by screws H⁴. These magnets may be so arranged that, in addition to actuating the contacts, they may form part of the blow-out system. For example, all the magnets secured to angle-iron A may be wound to produce a north pole at their upper end and the magnets secured to angle-iron A' to produce a south pole. By this arrangement each pair of magnets has a double utility—i. e., that of actuating a contact and that of aiding to disrupt the arc formed at the contacts E when the circuit is interrupted. Surrounding each magnet-core is a closed metal band G⁶, which prevents destructive arcing when the circuit of the magnet is interrupted and in addition serves as a guide for the rod G⁴.

At the extreme ends of the angle-irons are shunt-wound magnets I, which are energized whenever the motor-circuit is closed and furnish an initial field for the blow-out magnet. With this arrangement there is always a certain field for disrupting the arcs, which field is increased as additional contact-magnets are engaged.

The description heretofore has been limited to the motor-controller; but in addition I have provided what I term a "master-controller," meaning a controller or switch capable of regulating the operation of one or more motor-controllers. The extreme flexibility of the system renders it possible to use one or more master-controllers, as preferred, and to place them at any desired point or points—as, for example, one at each end of the car when a single car only is used or one on each car or at each end of each car when several cars are connected on one train.

The master-controller J (shown in Figs. 5 and 7) is mounted in any suitable place on the vehicle J', which vehicle is provided with two motors M M' and a motor-controller K'. The ends of the cable-wires on each car are provided with terminals K, which engage with corresponding terminals on another car when the two are united to form a train or a portion of a train. In the present instance two such controllers are shown in each car and situated at opposite ends in addition to the motor-controller, which may be located under the car floor or seats, as desired. Each motor-car forms a unit in itself—that is to say, it is provided with a trolley or contact device J⁴, which makes contact with conductor J⁵, motors M M', one or more master-controllers J, and a motor-controller, and is capable of independent regulation. Extending through the car is a cable J², to which are connected all the master-controllers and also the switch-actuating coils H of the motor-controllers. By this arrangement the train can be controlled from the ends or any intermediate point. It is to be understood that when the train is in operation all the master-controllers, with the exception of the one actually performing work, shall stand at the off position.

The master-controller J comprises a plurality of segments $J^3$, mounted on an insulating-support and arranged to bridge the spaces between pairs of stationary brushes. For example, contact 1' is arranged to bridge brushes 1 and 2 and contact 3' to bridge brushes 3 and 4.

In Fig. 5 the wires forming cable $J^2$ are separated so that the circuit connections may be traced more readily. The wires forming the cable are not intended to carry heavy currents, as the current for operating the motors does not enter them, but passes directly to the motor-controller, where the grouping of the motors and the amount of current passing is regulated as desired.

The magnet-coils are preferably all connected in multiple through each of the master-controllers J, one only of which is shown in Fig. 5 between the source of supply $J^5$ and the ground or return circuit $J^6$. The blow-out-magnet coils I are connected between wire 2 and the ground, so that they are included in circuit as soon as the master-controller moves from its off position.

In the present instance only two motors M and M' have been shown connected to each controller; but it is to be understood that the number of such motors will be varied to suit the traffic conditions.

The operation of my invention is as follows: With the brushes of master-controller J resting on line $a\ a$ current enters the trolley $J^4$, passes to brush 1, thence to brush and wire 2 by contact 1' through the blow-out-magnet coils I I, to ground. The second path is from wire 2 to coil $H^2$ to ground, which causes the magnet to attract its armature and close the motor-circuit between contacts $E^a$ and $E^b$. The third path is from trolley $J^4$, brush 5, by contact 5' to brush and wire 6, to coil $H^6$, to ground. This energizes the magnet and closes the circuit between contacts $E^d$ and $E^f$, and the motor-circuit is as follows: The current enters from trolley $J^4$ and passes by wire T to contact $E^a$, to contact $E^b$, through resistance R, and field and armature of motor M in series to contact $E^d$, by contact G, to contact $E^f$, to resistance R', field and armature of motor M' in series, to ground $J^6$. With the circuits arranged as above the motors are connected as at $a$, Fig. 6.

As the blow-out-magnet coils I I are permanently included in circuit when the contacts of the master-controller engage with the stationary brushes further reference to them will be omitted.

To increase the speed of the motors, the master-controller is moved farther to the left, so that the vertical line of brushes will rest on line $b\ b$, and the circuit is as follows: from trolley $J^4$ to brush 1, by contact 1' to brush and wire 2, to switch-coil $H^2$, to ground. A second path is from trolley $J^4$ to brush 5, by contact 5' to brush 6, to coil $H^6$, to ground, and the third path is from trolley $J^4$ to brush 3, to brush 4, by contact 3' to switch-coil $H^4$, to ground. This closes the motor-circuit between contacts $E^a$ and $E^b$, $E^b$ and $E^c$, $E^d$ and $E^f$ to ground. With this connection the motors are as shown at $b$, Fig. 6—that is to say, the motors are in series, with one-half the resistance cut out. To further increase the speed of the motors, the master-controller is moved to the left until the brushes rest on the line $c\ c$. The circuits in this instance are the same as above, with the exception that the coil $H^8$ is included in circuit, which closes the circuit of the main controller between contacts $E^f$ and $E^g$ and cuts out resistance $R'$. The motors are now coupled, as shown at $c$, Fig. 6.

The continued movement of the master-controller to the left interrupts the circuit of magnet $H^4$, permitting contact G to drop and insert resistance R. The next instant contact 9' bridges the brushes 9 and 10 and coil $H^{10}$ is energized, which closes the circuit between controller-contacts $E^h$ and $E^i$. This places a shunt around motor M', as shown at $c'$, Fig. 6, preparatory to connecting the motors in multiple. When the cylinder is moved to the point where the brushes rest upon line $d\ d$, the circuit of the master-controller is as follows: Current enters from trolley $J^4$ to brush 1, by contact 1' to brush 2, through coil $H^2$ to ground. A second path is from trolley $J^4$ to brush 9, by contact 9' to brush 10, to coil $H^{10}$, to ground. A third path is from trolley $J^4$ to brush 11, by contact 11' to brush 12, to coil $H^{12}$, to ground. This closes the circuit of the motor-controller between contacts E and $E^a$, $E^a$ and $E^b$, and $E^h$ and $E^i$ and connects the two motors in multiple, with full resistance in circuit. When the master-controller advances to a point where the brushes rest upon line $e\ e$, the circuit is the same as above, with the exception that coils $H^4$ and $H^8$ are energized. This causes the contacts G to shunt resistances R and R', and the motors are connected directly in parallel between the source of supply and the ground, as shown at $e$, Fig. 6.

It will be seen that the entire operation of the motor-controller is controlled by the master-controller which regulates the operation of the switch-coils H. As these coils are made of fine wire and are connected in shunt to the circuit, only a very small amount of energy is required to operate the main contacts on the motor-controller.

As the contacts are maintained in circuit with the motors only when the switch-coils are energized, it will be seen that in the event of failure of the source of supply all of the contacts on the controller will return to the off position, and the motor-circuit will be interrupted automatically at a plurality of points.

I have shown and described my controller in connection with a single car; but it is to be understood that the contact-operating coils H on the other cars and the main controller are connected in precisely the same manner as the one described, and when the master-controller is actuated it affects all of the cars on the train simultaneously. As all of the contacts G are maintained in circuit with the motors only when the switch-coils are energized, it will be seen that in the event of failure of the source of supply all of the contacts on the train will return to the off position, and the motor-circuit will be interrupted automatically at a plurality of points on each controller.

Certain types of train-controlled systems have been proposed in which upon an interruption or upon an interruption and restoration of the main-current circuit the motor-controllers are automatically brought back to zero. The result of such an arrangement is that at or after every slight momentary interruption of the power-circuit of any car the controller of that particular car begins to run back. It follows that upon the restoration of the power-circuit the controller of that particular car may be placed in a position different from the position of the controllers on other cars of the train, so that the different cars receive different accelerations and a "pulling and hauling" action takes place, which is exceedingly disagreeable and wasteful of current. It will be seen that with my improved system the defect is avoided.

When for any reason the power-circuit is interrupted, the motor-circuits are also instantaneously interrupted. If now it is desired that upon the restoration of the circuit the motor-controllers shall be simultaneously placed in the position which they occupied before the interruption, as would be the case where the interruption was only momentary, such as that caused by the presence of ice or paper upon the conductor, the motorman has simply to leave the controller in position and the result will be effected. If, however, the interruption is continuous for such a time that the speed of the motors materially decreases, it is only necessary for the motorman to place the master-controller in the position corresponding to the position in which he wishes the motor-controllers to be placed, when the circuit is restored, and the motor-controllers will then immediately upon restoration assume the desired position.

It should also be noticed that in my improved system of control the motor-controllers and master-controllers are in positive synchronous relation, so that when the master-controller is placed in any position the motor-controllers instantaneously assume the corresponding position without any appreciable time intervening and that any motion of the master-controller forward or back one notch or several notches will be instantaneously and accurately responded to by the motor-controllers.

What I claim as new, and desire to secure by Letters Patent of the United States, is—

1. In a controller for electric motors, the combination of a plurality of separately-actuated contacts for varying the motor speed, electromagnets for controlling the contacts, and means for controlling the magnets from a distance.

2. In a controller for electric motors, the combination of a plurality of separately-actuated contacts for changing the grouping of the motors from series to parallel, and an electromagnet for controlling the contacts.

3. The combination, with a plurality of motors, of a plurality of separately-actuated contacts for making the series-parallel connections, and electromagnetic means controllable from a distance for controlling their action.

4. The combination of a motor, a controller therefor, comprising a plurality of separately and electrically actuated contacts for controlling the motor speed, and a master-controller for regulating the operation of said contacts.

5. The combination of a plurality of motors, a plurality of master-controllers connected by a cable in multiple-arc relation, and separate individually-actuated contacts regulated by the master-controllers for connecting the motors in series and parallel.

6. In an electric controller, the combination of a plurality of separate electromagnetically-operated contacts for grouping the motors in series or parallel relation, and a master-controller for regulating the operation of the separate contacts.

7. In a train system, the combination of a number of cars united to form a train, motors for propelling the train mounted upon more than one of the cars, separate electrically-actuated contacts for connecting the motors in series and parallel, and a master-controller for regulating the operation of said contacts.

8. In a train system, the combination of a number of cars united to form a train, motors for propelling the train mounted on more than one of the cars, a plurality of separate electrically-actuated contacts for changing the grouping of the motors, a master-controller mounted on each motor-car, and connections whereby the master-controllers may operate the motor-controllers of the train.

9. In a train system, the combination of a number of cars united to form a train, motors for propelling the train mounted upon more than one of the cars, a plurality of separately-actuated contacts for changing the resistance of the circuits of the motors, mechanism for operating said contacts, a master-controller on each motor-car, and electrical connections between the master-controllers and the said mechanism, which are independent of the motor-circuits.

10. The combination of a plurality of motor-cars united to form a train, a controller on each motor-car comprising a plurality of separately and electrically actuated contacts, and a master-controller for establishing similar circuit connections on all the motor-cars simultaneously.

11. In a train system, the combination of a plurality of cars united to form a train, each provided with its own contact device and motors, a controller for the motors comprising a plurality of separately-actuated contacts, a master-controller for regulating the motor-controllers, and connections between all of the master-controllers on the train.

12. The combination of a plurality of motors for propelling a car, a controller comprising a plurality of separately-actuated contacts for changing the resistance of the circuits of the motors, mechanism for operating said contacts, a master-controller, and electrical connections between the master-controller and the said mechanism, which are independent of the motor-circuits.

13. The combination of a plurality of motors, a contact device for supplying current thereto, a controller having a plurality of separate magnetically-actuated contacts, for changing the motor-circuits, a plurality of master-controllers for regulating the motor-controller, and electrical connections between the magnets of the motor-controllers, which are independent of the motor-circuits.

14. In an electric controller, the combination of a plurality of separate contacts for changing the resistance of the motor-circuit, a blow-out magnet, and an electromagnet for actuating the contacts and assisting to energize the blow-out magnet.

15. In a controller for electric motors, the combination of a plurality of separately-actuated contacts for varying the motor speed, electromagnetic means for controlling the contacts from a distant point, and means for extinguishing the arcs formed at the contacts.

16. In a controller, the combination of a plurality of separately-actuated contacts, a blow-out magnet, and shunt-wound magnets for actuating the contacts, so arranged that they assist the blow-out magnet to disrupt the arcs formed between contacts.

17. In a controller, the combination of a plurality of separately-actuated contacts, a shunt-wound blow-out magnet, and shunt-wound magnets for actuating the contacts, so arranged that they assist the blow-out magnet to disrupt the arcs formed between contacts.

18. In a controller, the combination of a plurality of separately-actuated magnetically-controlled contacts, and means for returning the contacts to their off position as soon as current ceases to flow in the operating-magnets.

19. In a controller, the combination of a plurality of stationary contacts, separately-actuated moving contacts for closing the circuit of the stationary contacts, and electromagnets for controlling the moving contacts and holding them in engagement with the stationary contacts, the arrangement being such that as soon as current ceases to pass through the magnets, the contacts will return to their open position.

20. In a train system of control, the combination of a controller for each motor-car, comprising a plurality of separately-actuated contacts for regulating the motor-circuits, electromagnets for controlling the contacts, the arrangement being such that as soon as current ceases to pass through the coils, the motor-circuit will be interrupted at the contacts, and a master-controller for regulating the operation of the separate contacts.

21. The combination of a plurality of motors, a controller therefor, comprising a plurality of separately-actuated contacts for regulating the motor-circuits, and electromagnets for controlling the operation of the contacts, the arrangement being such that as soon as current ceases to pass through the coils, the motor-circuit will be interrupted at the contacts, and a master-controller for regulating the operation of the separate contacts.

22. In an electric controller, the combination of a plurality of separately-actuated contacts, an electromagnet for operating each contact, and a closed metal band surrounding the core of each magnet to decrease the arcing at the time the circuit of the electromagnet is interrupted.

23. In an electric controller, the combination with a plurality of separate contacts, of a common blow-out magnet, energized by the magnets which actuate the contacts.

24. In a train system, a plurality of cars equipped with motors and motor-controllers, one or more master-controllers for operating the motor-controllers, and means whereby, upon the interruption of the power-circuit, the motor-controllers will, upon the restoration of the circuit, be instantaneously restored to the position which they occupied before the interruption.

25. In a train system, the combination with a plurality of cars supplied with motors and with motor-controllers, of a master-controller, and electromagnetically-controlled means whereby the motor-controllers assume at all times positions corresponding to the position of the master-controllers, and are maintained in rigid synchronism therewith, irrespective of the direction of motion of the master-controller.

In witness whereof I have hereunto set my hand this 18th day of February, 1898.

ELIHU THOMSON.

Witnesses:
V. H. McGUFFIN,
D. McKILLOP.